United States Patent [19]

Mailliet

[11] 3,952,375
[45] Apr. 27, 1976

[54] DOUBLE CLAMPING RINGS
[75] Inventor: Jean Mailliet, Boulogne-Billancourt, France
[73] Assignees: Regie Nationale des Usines Renault; Automobiles Peugeot, both of France
[22] Filed: June 13, 1975
[21] Appl. No.: 586,588

[30] Foreign Application Priority Data
June 28, 1974 France .............................. 74.22623

[52] U.S. Cl. .............................. 24/81 PE; 403/206; 403/209
[51] Int. Cl.² ......................................... A44B 21/00
[58] Field of Search ............ 24/81 PE, 81; 403/206, 403/209; 256/48

[56] References Cited
UNITED STATES PATENTS
2,295,051   9/1942   Roth ................................ 24/81 PE
2,327,307   8/1943   Jenne ................................ 403/209

Primary Examiner—Robert L. Wolfe
Assistant Examiner—Doris L. Troutman
Attorney, Agent, or Firm—Stevens, Davis, Miller & Mosher

[57] ABSTRACT

The invention relates to a double clamping ring suitable for clamping coaxial or non-coaxial couplings of members having a circular or non-circular cross-section, or a tubular cross-section. Said ring consists of a single piece of metal or non-metallic wire screw-threaded at at least both ends and comprises two end sections consisting each of at least the three-fourths of a turn, these end sections being interconnected by a rectilinear or loop-shaped section, the curved junction sections between each partial turn and the rectilinear or loop-shaped section surrounding partially the screw-threaded ends to provide bearing surfaces for the tightening nuts to be engaged on said screw-threaded ends.

4 Claims, 6 Drawing Figures

DOUBLE CLAMPING RINGS

The present invention relates to double clamping rings or clamps consisting of metal wire or other wire-like materials, adapted to fasten coaxially or not elements such as circular-sectioned or tubular members or pieces, or flexible or rigid pipings.

Clamping rings are already known which consist of a wire forming at least the three-fourths of a turn and having one end screw-threaded and the other end shaped to a hook or loop configuration surrounding the screw-threaded end and acting as a bearing surface to a clamping or tightening nut adapted to engage said screw-threaded portion.

Clamping rings of this known type are used notably for fastening, coaxially or not, hoses or pipes, but under hard operating conditions they are not entirely satisfactory.

It is the essential object of the present invention to provide a double clamping ring adapted to be used for the coaxial or non-coaxial clamping of circular-sectioned or tubular members, or even members having any desired cross-sectional configuration.

The double clamping ring according to this invention is characterized in that it consists of a single length of metal wire or other wire-shaped material, screw-threaded at both ends, and comprising two end portions consisting each of at least three-fourths of a turn, said end portions being interconnected by a rectilinear or loop-shaped portion, the curved junction sections between each fragmentary turn and the rectilinear or loop-shaped portion surrounding partly the screw-threaded portions to provide bearing surfaces for the tightening nuts adapted to be fitted to said screw-threaded ends.

The wire material may be metallic or not and its cross-sectional shape is not compulsorily circular; thus, a square, hexagonal or other cross-sectional shape may be used, the screw-threads being formed either by stamping the corners or rounded edges, or alternatively by shaping, or simply by standard machining (screw-cutting).

The wire is shaped in the known fashion on a conventional automatic machine and in a same and single operation.

According to an advantageous form of embodiment, an intermediate flat member interconnecting or not the two screw-threaded ends is disposed between the bearing loop of the clamping ring and each nut.

When a relatively tight clamping action is desired, a special nut or a distance-piece conforming with the wire contour may be used to eliminate any risk of jamming between the bearing loop and the rectilinear section.

In order to afford a clearer understanding of the present invention and the manner in which the same may be carried out in practice, typical embodiments thereof will now be described with reference to the attached drawing, in which.

Figure 1:
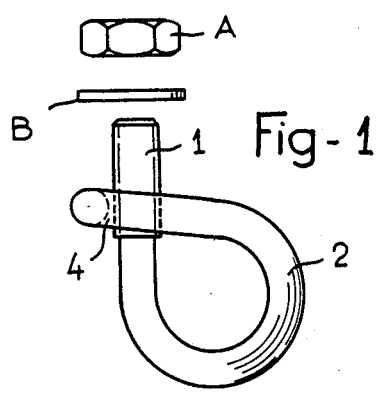
FIG. 1 is a side elevational view of the double clamping ring according to this invention, applicable to a coaxial coupling arrangement.

The double clamping ring according to this invention comprises two screw-threaded ends 1, 1a of two single-turn (i.e. comprising at least the three-fourths of a turn) sections 2, 2a interconnected by an intermediate section either rectilinear 3 or loop-shaped 5. These intermediate sections 3 or 5 provide bearing surfaces 4, 4a for the tightening nuts at their junction with the spiral sections 2, 2a, respectively.

In FIG. 1 there is shown diagrammatically by way of example a nut A and a washer B adapted to engage the area 4. In certain cases, this washer B may be omitted.

Figure 3:
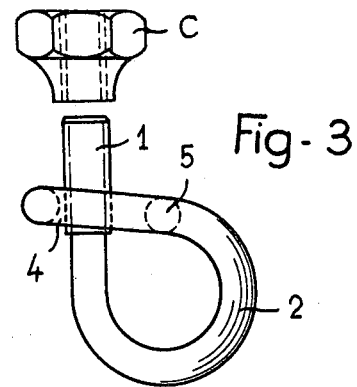
FIG. 3 is a side elevational view of another form of embodiment of a double clamping ring according to this invention.
Figure 2:
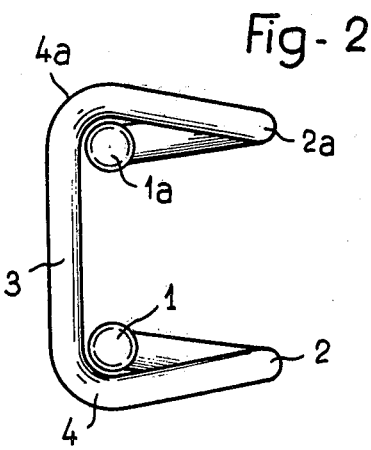
FIG. 2 is a plan view from above of the ring of FIG. 1.

In FIG. 3 the intermediate section 5 in loop-shaped to provide an additional bearing surface when tightening the ring by means of a special nut C having a lower portion conforming with the contour of the wire.

In FIGS. 2 to 6 the same elements of the double clamping ring are designated by the same reference symbols as in FIG. 1, the assembly comprising the nut A and washer B being omitted.

Figure 4:
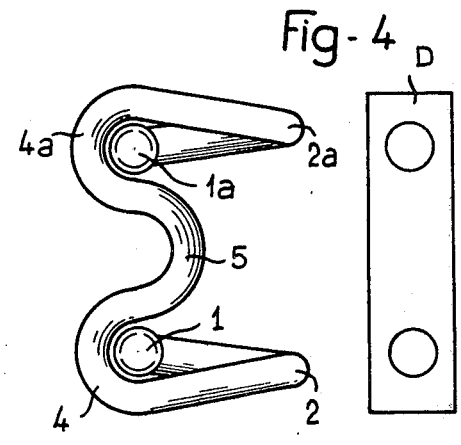
FIG. 4 is a plan view from above of the ring shown in FIG. 3.
Figure 5:
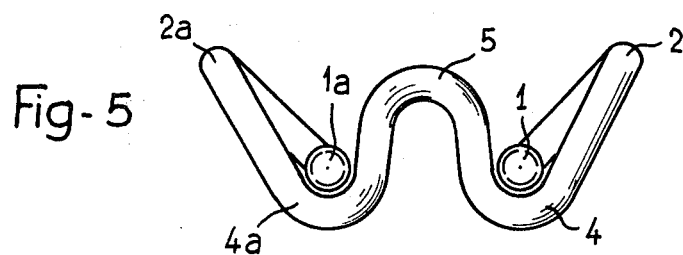
FIGS. 5 and 6 are plane views from above of modified forms of embodiment of the clamping ring according to this invention, which are applicable to non-coaxial coupling arrangements, the members to be connected and clamped being set at different angles and symmetrically or not.
Figure 6:
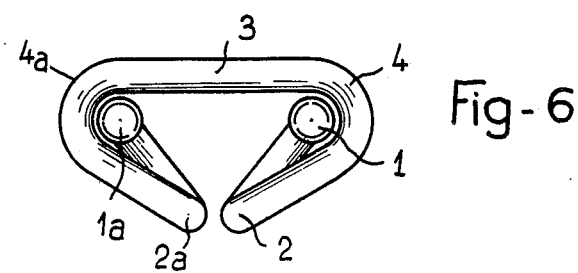

FIG. 4 illustrates also by way of example on the right-hand side a connecting strip D adapted to be engaged by the nuts and to reinforce the assembly by acting as a distance-piece between the screw-threaded portions.

Although specific forms of embodiment of this invention have been described herein-above and illustrated in the accompanying drawing, it will readily occur to those skilled in the art that various modifications and changes may be brought thereto without departing from the scope of the invention as set forth in the appended claims.

What is claimed as new is:

1. A double clamping ring for clamping coaxial or non-coaxial couplings of circular-sectioned or tubular members or members having any other cross-sectional contour, said clamping ring comprising a single piece of metal or non-metallic wire screw-threaded at at least its two ends, and two end sections consisting each of at least the three-fourths of a turn, said end sections being interconnected by a rectilinear or loop-shaped section, the curved junction sections between each partial turn and said rectilinear or loop-shaped section surrounding partially said screw-threaded ends to constitute bearing surfaces for the tightening nuts to be engaged on said screw-threaded ends.

2. Double clamping ring as set forth in claim 1, wherein an intermediate connecting and reinforcing strip is disposed between the tightening nut and the bearing surface consisting of the junction between a turn section and the rectilinear or loop-shaped interconnecting section.

3. Double clamping ring as set forth in claim 1, wherein the wire has a circular, square, hexagonal or other suitable cross-sectional contour, the complete or partiel screw-threads being obtained by stamping shaping, deformation or machining of the corners or rounded edges thereof.

4. Double clamping ring as set forth in claim 2, wherein the tightening nuts or the intermediate strip have a particular shape conforming with the contour of the wire section constituting the ring.

* * * * *